United States Patent
Shim et al.

(10) Patent No.: US 9,131,586 B2
(45) Date of Patent: Sep. 8, 2015

(54) METHOD AND APPARATUS FOR MEASURING INJECTION ENERGY OF ORGANIC LIGHT EMITTING DIODE DISPLAY

(71) Applicant: SAMSUNG DISPLAY CO., LTD., Yongin, Gyeonggi-Do (KR)

(72) Inventors: Tae-Kyu Shim, Yongin (KR); Hye-Lim Shin, Yongin (KR); Won-Jun Song, Yongin (KR); Jae-Bok Kim, Yongin (KR)

(73) Assignee: SAMSUNG DISPLAY CO., LTD. (KR)

( * ) Notice: Subject to any disclaimer, the term of this patent is extended or adjusted under 35 U.S.C. 154(b) by 223 days.

(21) Appl. No.: 13/958,182

(22) Filed: Aug. 2, 2013

(65) Prior Publication Data

US 2014/0327376 A1    Nov. 6, 2014

(30) Foreign Application Priority Data

May 2, 2013    (KR) .................. 10-2013-0049437

(51) Int. Cl.
    *G01R 25/00*     (2006.01)
    *H05B 33/08*     (2006.01)

(52) U.S. Cl.
    CPC .................. *H05B 33/0896* (2013.01)

(58) Field of Classification Search
    USPC ............................ 315/297; 324/88
    See application file for complete search history.

(56) References Cited

U.S. PATENT DOCUMENTS

| | | | |
|---|---|---|---|
| 5,523,555 A * | 6/1996 | Friend et al. | 250/214 R |
| 7,262,753 B2 | 8/2007 | Tanghe et al. | |
| 2003/0078741 A1 * | 4/2003 | Storino | 702/34 |
| 2003/0116767 A1 * | 6/2003 | Kneissl et al. | 257/79 |
| 2005/0001247 A1 * | 1/2005 | Ozawa et al. | 257/291 |
| 2010/0283584 A1 * | 11/2010 | McAllister | 340/10.1 |
| 2010/0320443 A1 * | 12/2010 | Jiang et al. | 257/14 |
| 2011/0248249 A1 * | 10/2011 | Forrest et al. | 257/40 |
| 2011/0317398 A1 * | 12/2011 | Moeck et al. | 362/84 |
| 2012/0205613 A1 * | 8/2012 | Mi et al. | 257/9 |
| 2012/0326192 A1 * | 12/2012 | Van Slyke et al. | 257/98 |
| 2013/0054177 A1 * | 2/2013 | Montenegro et al. | 702/108 |
| 2013/0202782 A1 * | 8/2013 | Mandlik et al. | 427/66 |
| 2013/0240348 A1 * | 9/2013 | Mi et al. | 204/157.5 |
| 2013/0285024 A1 * | 10/2013 | Ma et al. | 257/40 |
| 2013/0334986 A1 * | 12/2013 | Inoue et al. | 315/312 |
| 2014/0327376 A1 * | 11/2014 | Shim et al. | 315/297 |
| 2015/0048397 A1 * | 2/2015 | Northrup et al. | 257/98 |
| 2015/0060908 A1 * | 3/2015 | Jain et al. | 257/94 |

FOREIGN PATENT DOCUMENTS

| | | |
|---|---|---|
| JP | 2005-010577 | 1/2005 |
| KR | 100680913 | 2/2007 |
| KR | 1020100083362 | 7/2010 |

* cited by examiner

*Primary Examiner* — Adam Houston
(74) *Attorney, Agent, or Firm* — Innovation Counsel LLP

(57) ABSTRACT

A method is used for measuring injection energy associated with an organic light emitting diode display device. The method includes disposing the display panel inside a chamber and controlling temperature inside the chamber. The method further includes determining a plurality of electric current values corresponding to a plurality of temperature values for each voltage value of plurality of voltage values, the plurality of voltage values being associated with voltages provided to the organic light emitting member. The method further includes calculating a plurality of injection energy values using the plurality of electric current values and the plurality of temperature values.

14 Claims, 5 Drawing Sheets

METHOD AND APPARATUS FOR MEASURING INJECTION ENERGY OF ORGANIC LIGHT EMITTING DIODE DISPLAY

CROSS-REFERENCE TO RELATED APPLICATION

This application claims priority to and the benefit of Korean Patent Application No. 10-2013-0049437 filed in the Korean Intellectual Property Office on May 2, 2013, the entire contents of which are incorporated herein by reference.

BACKGROUND

1. Field

The present invention is related to a method and an apparatus for measuring injection energy of an organic light emitting diode (OLED) display.

2. Description of the Related Art

An organic light emitting diode (OLED) display typically includes a cathode, an anode, and an organic emission layer interposed between the cathode and anode. Electrons injected from the cathode and holes injected from the anode may be bonded to each other in the organic emission layer to form excitons, and light may be emitted while the excitons discharge energy. Injection energy of organic light emitting diode (OLED) display is energy associated with the injected electrons and the injected holes.

For an organic light emitting diode (OLED) display, a current injection characteristic may be determined by measuring a current for an application voltage. Nevertheless, it may be difficult to measure injection energy (activation energy) of the organic emission layer. Although different organic emission layers may have the same current injection characteristic, applied electrical stress amounts may be different for different organic emission layers, such that injection energy levels may be different for different organic emission layers, and therefore luminous efficiency levels and lifespans may be different for different organic emission layers.

As can be appreciated from the discussion above, the injection energy of an organic emission layer may not be determined by only measuring the current injection characteristic of the organic emission layer. As a result, it may be difficult to correctly predict the luminous efficiency and the life-span of the organic light emitting diode (OLED) display.

The above information disclosed in this Background section is for enhancement of understanding of the background of the invention. The Background section may contain information that does not form the prior art that is already known in this country to a person of ordinary skill in the art.

SUMMARY

One or more embodiments of the invention may be related to a method for measuring injection energy associated with an organic light emitting diode display device. The method may include disposing the display panel inside a chamber and may include controlling temperature inside the chamber. The method may further include determining a plurality of electric current values corresponding to a plurality of temperature values for each voltage value of plurality of voltage values, the plurality of voltage values being associated with voltages provided to the organic light emitting member. The method may further include calculating a plurality of injection energy values using the plurality of electric current values and the plurality of temperature values.

In one or more embodiments, the method may include the following steps: disposing a power supplier outside the chamber; and using the power supplier to provide the voltages to the organic light emitting member.

In one or more embodiments, the method may include the following steps: disposing a panel signal device and the computer outside the chamber; and for each temperature value of the plurality of temperature values, using at least one of the panel signal device and the computer to determine a voltage-current relation associated with the organic light emitting member.

In one or more embodiments, the method may include the following step: disposing the panel driver inside the chamber.

In one or more embodiments, the method may include the following step: disposing the panel driver outside the chamber.

In one or more embodiments, the method may include the following steps: determining injection energy values of a red pixel of the display panel; determining injection energy values of a green pixel of the display panel; and determining injection energy values of a blue pixel of the display panel.

In one or more embodiments, the method may include the following step: determining a relation between the plurality of injection energy values and the plurality of voltage values.

In one or more embodiments, the method may include the following steps: identifying a first range of the plurality of voltage values that corresponds to a first range of the plurality of injection energy values; identifying a second range of the plurality of voltage values that corresponds to a second range of the plurality of injection energy values, the second range of the plurality of injection energy values being smaller than the first range of the plurality of injection energy values; and using a selected voltage value in the second range of the plurality of voltage values for operating the organic light emitting diode display device after the identifying the second range of the plurality of voltage values.

In one or more embodiments, the method may include the following steps: identifying a first voltage value that corresponds to a first injection energy value; identifying a second voltage value that corresponds to a second injection energy value, the second injection energy value being less than the first injection energy value; and using the second voltage value for operating the organic light emitting diode display device after the identifying the second voltage value, wherein the plurality of injection energy values includes the first injection energy values and the second injection energy value, and wherein the plurality of voltage values includes the first voltage value and the second voltage value.

One or more embodiments of the invention may be related to an apparatus for measuring injection energy associated with an organic light emitting diode display device. The organic light emitting diode display device may include a display panel and a panel driver, the display panel including an organic light emitting member and being configured to display an image, the panel driver being configured to drive the display panel. The apparatus may include a chamber configured to contain the display panel and configured to control temperature of the display panel. The apparatus may further include a power supplier configured to provide voltages to the display panel. The apparatus may further a panel signal device disposed outside the chamber and configured to determine a voltage-current relation associated with the organic light emitting member for each temperature value of the plurality of temperature values. The plurality of electric current values may be measured using a current probe or a voltage-current probe (i.e., V-I probe) that is known in the art. The apparatus may include a computer including hardware and configured to calculate a plurality of injection energy values using the plurality of electric current values and the plurality of temperature values.

In one or more embodiments, the power supplier is disposed outside the chamber.

In one or more embodiments, the chamber is configured to contain the panel driver.

In one or more embodiments, the chamber is configured to receive and accommodate a flexible printed circuit board that includes a first end disposed inside the chamber for connecting to the display panel and includes a second end disposed outside the chamber for connecting to the panel driver.

In one or more embodiments, the computer is configured to determine injection energy values of a red pixel of the display panel, configured to determine injection energy values of a green pixel of the display panel; and configured to determine injection energy values of a blue pixel of the display panel.

One or more embodiments of the invention may be related to a method for measuring injection energy of an organic emission layer of an organic light emitting diode display device as well as for determining a current injection characteristic of the organic emission layer.

The method may include the following steps: positioning at least a portion (e.g., a display panel configured to display an image) of the organic light emitting diode display device in a chamber in which temperature may be controlled; controlling the temperature in the chamber and determining relations of voltage values and current values associated with different temperature values under different temperature conditions of the portion of the organic light emitting diode display device positioned inside the chamber; and calculating injection energy values of the organic light emitting diode display device using the current values and the temperature values.

The relations of the voltage values and the current values may be determined using the following steps: applying a voltage to the organic light emitting diode display device using a power supplier positioned outside the chamber; and determining the relations of the voltage values and the current values using a panel signal device positioned outside the chamber.

The organic light emitting diode display may further include a panel driver for driving the display panel, and the panel driver may be positioned outside or inside the chamber when one or more of the current values and the injection energy values are measured and/or calculated.

The injection energy values of the organic light emitting diode display device may be calculated using a relationship equation that relates current density (which is related to current values), injection energy, and temperature.

The injection energy of each pixel may be measured by separately driving a red pixel, a green pixel, and a blue pixel in the display panel using the panel driver.

According to one or more embodiments of the invention, the injection energy of the organic emission layer as well as the current injection characteristic of the organic emission layer may be measured.

Accordingly, information on the luminous efficiency and the life-span of the organic light emitting diode display device having the organic emission layer (which may be formed with different organic materials) may be obtained.

In one or more embodiments of the invention, suitable voltage values may be selected based on relation between voltage values and injection energy values. Advantageously, suitable voltage values may be used in operating the organic light emitting diode display device, such that optimal luminous efficiency and/or optimal life-span may be provided.

DETAILED DESCRIPTION

Figure 1:
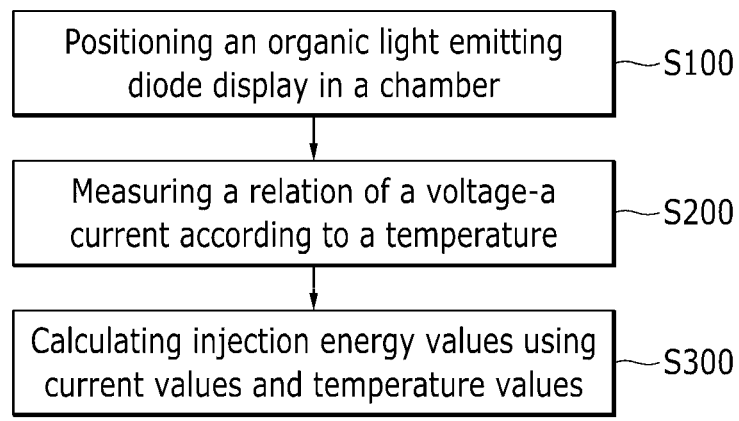
FIG. 1 is a flowchart illustrating a method for measuring injection energy of an organic light emitting diode (OLED) display according to one or more embodiments of the invention.

Embodiments of the invention are described more fully hereinafter with reference to the accompanying drawings. As those skilled in the art would realize, the described embodiments may be modified in various ways, all without departing from the spirit or scope of the present invention.

The drawings and description are to be regarded as illustrative in nature and not restrictive. Like reference numerals may designate like elements throughout the specification.

Sizes and thicknesses of constituent members shown in the accompanying drawings are for better understanding and/or for ease of description. Embodiments of the present invention are not limited to the illustrated sizes and thicknesses.

Various embodiments are described herein below, including methods and techniques. Embodiments of the invention might also cover an article of manufacture that includes a non-transitory computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out operations pertaining to embodiments of the invention. Examples of such apparatus include a general purpose computer and/or a dedicated computing device when appropriately programmed and may include a combination of a computer/computing device and dedicated/programmable hardware circuits (such as electrical, mechanical, and/or optical circuits) adapted for the various operations pertaining to embodiments of the invention.

Figure 2:
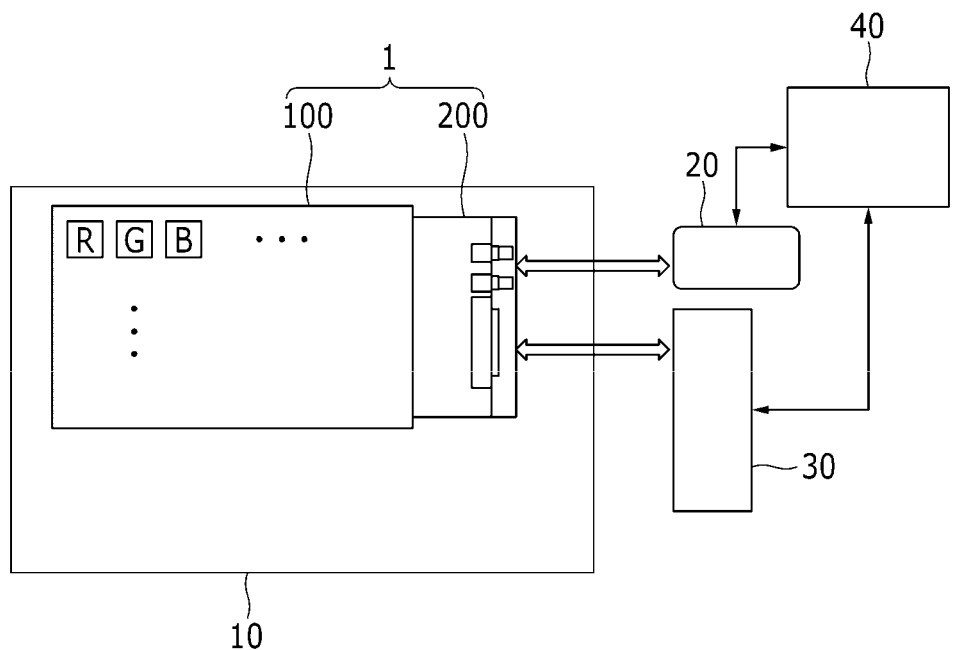
FIG. 2 is a schematic diagram illustrating a device and a method for measuring injection energy of an organic light emitting diode (OLED) display according to one or more embodiments of the invention.
Figure 3:
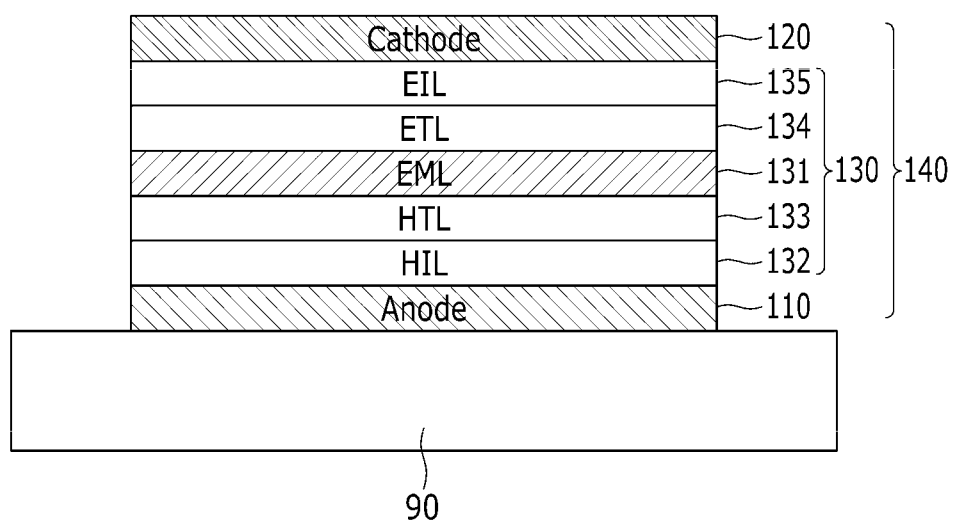
FIG. 3 is a layered structure view illustrating an organic light emitting diode (OLED) of an organic light emitting diode (OLED) display of which injection energy may be measured according to one or more embodiments of the invention.
Figure 4:
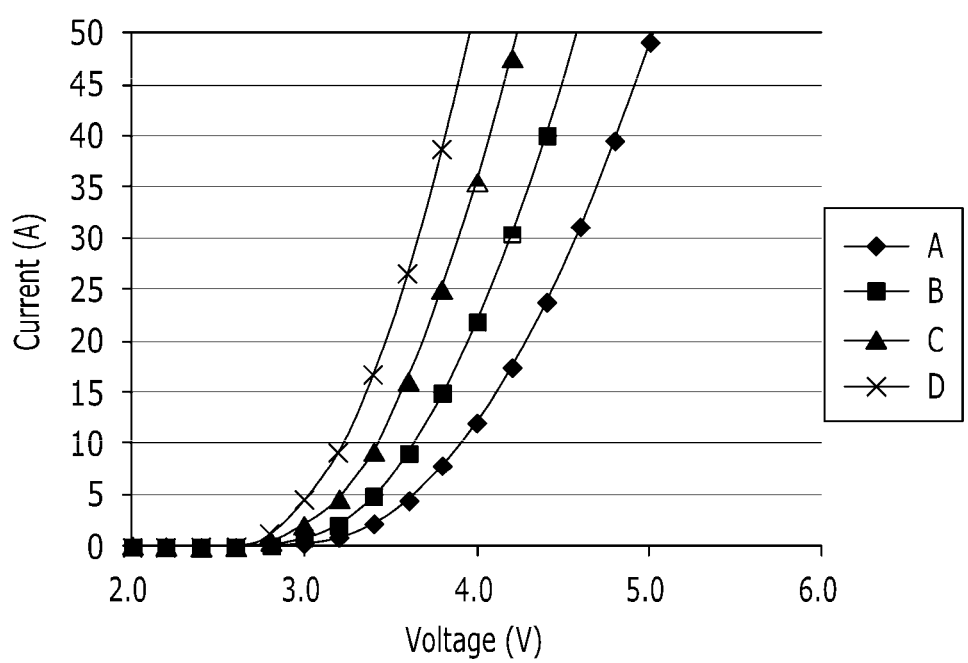
FIG. 4 is a graph illustrating relations of voltage values and current values measured under different temperature conditions according to one or more embodiments of the invention.
Figure 5:
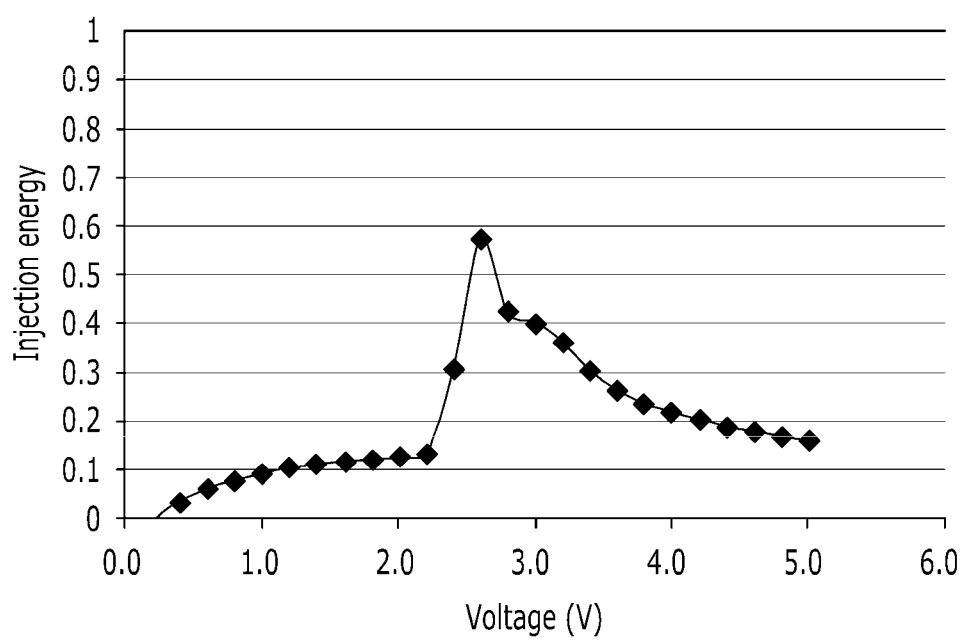
FIG. 5 is a graph illustrating a relation of voltage values and injection energy values according to one or more embodiments of the invention.

FIG. 1 is a flowchart illustrating a method for measuring injection energy of an organic light emitting diode (OLED) display according to one or more embodiments of the invention. FIG. 2 is a schematic diagram illustrating a device and a method for measuring injection energy of an organic light emitting diode (OLED) display according to one or more embodiments of the invention. FIG. 3 is a layered structure view illustrating an organic light emitting diode (OLED) of an organic light emitting diode (OLED) display of which injection energy may be determined according to one or more embodiments of the invention. FIG. 4 is a graph illustrating relations of voltage values and current values measured under different temperatures according to one or more embodiments of the invention. FIG. 5 is a graph illustrating a relation of voltage values and injection energy values according to one or more embodiments of the invention.

As illustrated in FIG. 2, the device may include a chamber 10, a power supplier 20, a panel signal device 30, and a controller 40.

As shown in FIG. 1 and FIG. 2, for measuring injection energy of an organic light emitting diode (OLED) display according to one or more embodiments of the invention, In step S100, an organic light emitting diode (OLED) display 1 (or a portion thereof, e.g., an OLED display panel) may be disposed inside the chamber 10. Temperature of the space inside the chamber 10 may be controlled.

The organic light emitting diode (OLED) display 1 may include a display panel 100 for displaying an image and may include a panel driver 200 for driving the display panel 100. The panel driver 200 may be positioned inside the chamber 10.

As shown in FIG. 3, the display panel 100 may include an organic light emitting member 140 formed on a substrate 90. The organic light emitting member 140 may include an anode 110, an organic emission layer 130, and a cathode 120. Holes and electrons are respectively injected from the anode 110 and the cathode 210 into the organic emission layer 130 to form excitons. When the excitons change from an excited state to a ground state, light is emitted. The organic emission layer 130 may have a multi-layer structure, which may include an emission layer (EML) 131 and at least one of a hole injection layer (HIL) 132, a hole transport layer (HTL) 133, an electron transport layer (ETL) 134, and an electron injection layer (EIL) 135. The hole injection layer (HIL) 132 may be disposed on (and may directly contact) the anode 110, which is a positive electrode. The hole transport layer (HTL) 133, the emission layer 131, the electron transport layer (ETL) 134, and the electron injection layer (EIL) 135 may be sequentially deposited on the hole injection layer (HIL) 132. The injection energy is energy associated with the electrons and the holes that are injected into the organic emission layer 130.

In step S200, the temperature inside the chamber 10 may be controlled, and relations of voltage values and current values in the organic emission layer 130 of the organic light emitting diode (OLED) display 1 (which is positioned in the chamber 10) may be determined under various temperature conditions.

A voltage may be applied to the organic light emitting diode (OLED) display 1 by the power supplier 20, which may be positioned outside the chamber 10. Voltage-current relations associated with the organic light emitting diode (OLED) display 1 may be determined using at least one of the panel signal device 30 and the controller 40, which may be positioned outside the chamber 10. The power supplier 20 and the panel signal device 30 may be connected to the panel driver 200 (which may be disposed inside the chamber 10) through at least a cable. The power supplier 20 and the panel signal device 30 may be controlled by the controller 40, which may be a computer that includes hardware.

When the display panel 100 is operated using the power provided to the panel driver 200 from the power supplier 20, the relationship of the voltage and the current in the organic emission layer 130 of the driven display panel 100 may be determined by at least one of the panel signal device 30 and the controller 40. Electric current values at the organic emission layer 130 may be measured using a current probe that is well-known in the art. Voltage-current relations associated with the organic emission layer 130 under various temperature conditions may be determined through controlling the temperature inside the chamber 10.

FIG. 4 is a graph illustrating voltage-current relations associated with an organic light emitting diode (OLED) display under various temperature conditions according to one or more embodiments of the invention. In FIG. 4, curve A represents a voltage-current relation at 20 degrees Celsius, curve B is represents a voltage-current relation at 40 degrees Celsius, curve C represents a voltage-current relation at 60 degrees Celsius, and curve D represents a voltage-current relation at 80 degrees Celsius.

As shown in FIG. 4, as the temperature is increased, the current in the organic emission layer 130 may increase if the voltage remains unchanged.

In step S300, values of injection energy in the organic emission layer 130 of the organic light emitting diode (OLED) display 1 may be calculated using current values and temperature values according to Equation:

$$J \propto J_0 \exp\left(-\frac{\Delta E_a}{kT}\right) \qquad \text{(Equation 1)}$$

In Equation 1, J is a current density value, $J_0$ is an initial current density value, Ea is an injection energy value, T is a temperature value, and k is a Boltzmann constant.

FIG. 5 is a graph illustrating a relation voltage values and injection energy values according to one or more embodiments of the invention.

Current values corresponding to each voltage value shown in FIG. 4 are related to current density values. An injection energy value associated with each voltage value may be obtained using corresponding current density values and temperature values according to Equation 1. As a result, a relation of injection energy values and voltage values may be obtained.

For example, as shown in FIG. 4, when the voltage is about 4 V, the current is about 13 A at the temperature of 20 degrees Celsius, the current is about 23 A at the temperature of 40 degrees Celsius, the current is about 35 A at the temperature of 60 degrees Celsius, and the current is about 50 A at the temperature of 80 degrees Celsius. According to Equation 1, when the voltage is about 4 V, the injection energy may be calculated using the current values and the temperature values. Analogously, injection energy values corresponding to other voltage values may be calculated using Equation 1, current values, and temperature value. FIG. 5 illustrates a relation of injection energy values and voltage values.

FIG. 5 indicates that the injection energy of the organic emission layer 130 may be substantially changed in a voltage value range from about 2.3 V to about 3.0 V.

In the organic light emitting diode (OLED) display 1, a balance between the injection of the electrons and the injection of the holes may be important. If the injection energy is large, the injection of the electrons and the injection of the holes may not have a desirable balance, the injection of the electrons and the holes to the organic emission layer 130 may not be sufficiently smooth. As a result, the luminous efficiency and the life-span of the organic emission layer 130 may tend to be undesirable. In contrast, if the injection energy is sufficiently small, the injection of the electrons and holes to the organic emission layer 130 may be sufficiently smooth, such that the luminous efficiency and the life-span of the organic emission layer 130 may tend to be desirable.

As can be appreciated from the discussion provided above, according to embodiments of the invention, information related to the luminous efficiency and the life-span of the organic light emitting diode (OLED) display 1 (which includes the organic emission layer 130 having different organic materials) may be obtained.

In one or more embodiments, a red pixel (R), a green pixel (G), and a blue pixel (B) inside the display panel 100 may be separately driven by the panel driver 200. Accordingly, the injection energy of each of the pixels R, G, and B may be individually measured.

In one or more embodiments, in determining voltage-current relations under various temperature conditions, the panel driver 200 may be positioned outside the chamber 10. Accordingly, the panel driver 200 may provide the display panel 100 with consistent signals without be substantially affected by temperature change and/or heat.

Figure 6:
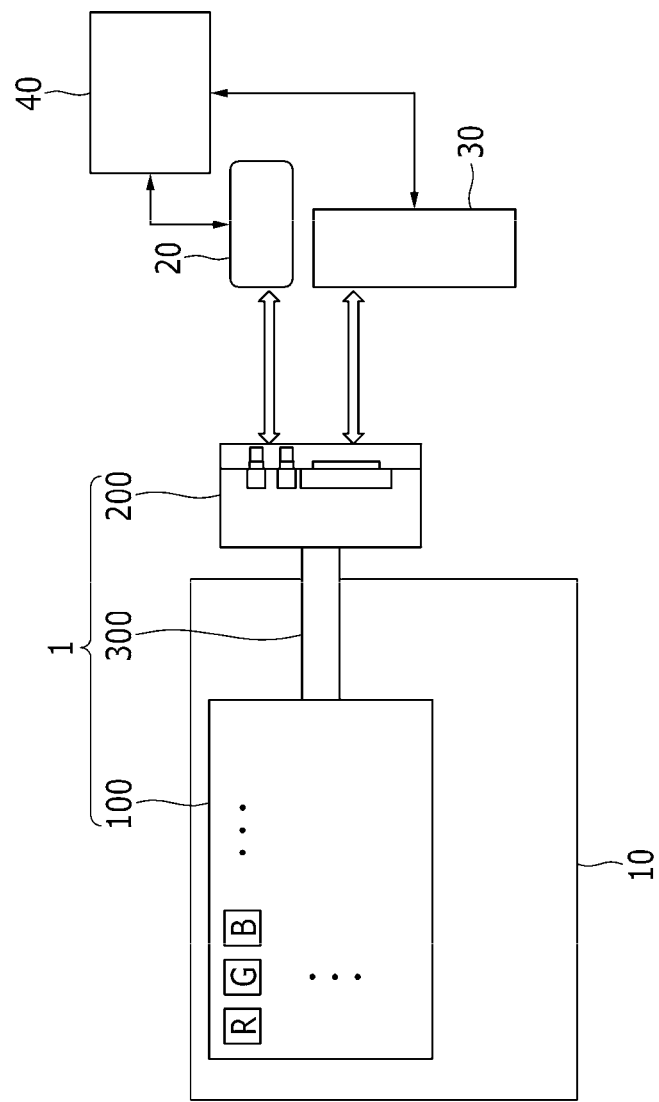
FIG. 6 is a schematic diagram illustrating a device and a method for measuring injection energy of an organic light emitting diode (OLED) display according to one or more embodiments of the invention.

FIG. 6 is a schematic diagram illustrating a device and a method for measuring injection energy of an organic light emitting diode (OLED) display according to one or more embodiments of the invention.

The device and the method illustrated in FIG. 6 may be substantially analogous to the device and the method discussed with reference to FIGS. 1 to 5. Nevertheless, the device illustrated in FIG. 6 may facilitate positioning the panel driver 200 outside the chamber 10 when measuring the injection energy of the organic light emitting diode (OLED) display 1, and the method illustrated in FIG. 6 may include disposing the panel driver 200 outside the chamber 10 when the injection energy is measured.

As shown in FIG. 6, the organic light emitting diode (OLED) display 1 includes a display panel 100 for displaying the images, a panel driver 200 for driving the display panel 100, and a flexible printed circuit board (FPCB) 300 connecting the display panel 100 and the panel driver 200. The panel driver 200 may be positioned outside the chamber 10 when the measuring device (which includes the chamber 10, the power supplier 20, the panel signal device 30, and the controller 40) measures the injection energy of the organic emission layer 130 of the organic light emitting diode (OLED) display 1. Accordingly, the panel driver 200 may not be substantially affected by the heat and/or the temperature change inside the chamber 10. As a result, correct and consistent panel signals may be provided to the display panel 100. Therefore, the injection energy of the organic emission layer 130 may be correctly measured.

While this invention has been described in connection with what is presently considered to be practical embodiments, the invention is not limited to the disclosed embodiments. The invention is intended to cover various modifications and equivalent arrangements included within the spirit and scope of the appended claims.

<Description of Symbols>

| 10: chamber | 20: power supplier |
|---|---|
| 30: panel signal device | 100: display panel |
| 200: panel driver | 300: flexible printed circuit board (FPCB) |

What is claimed is:

1. A method for measuring injection energy associated with an organic light emitting diode display device, the method comprising:
   disposing the display panel inside a chamber;
   controlling temperature inside the chamber;
   determining a plurality of electric current values corresponding to a plurality of temperature values for each voltage value of plurality of voltage values, the plurality of voltage values being associated with voltages provided to the organic light emitting member; and
   calculating a plurality of injection energy values using the plurality of electric current values and the plurality of temperature values.

2. The method of claim 1, further comprising:
   disposing a power supplier outside the chamber; and
   using the power supplier to provide the voltages to the organic light emitting member.

3. The method of claim 1, further comprising:
   disposing a panel signal device and the computer outside the chamber; and
   for each temperature value of the plurality of temperature values, using at least one of the panel signal device and the computer to determine a voltage-current relation associated with the organic light emitting member.

4. The method of claim 1, further comprising: disposing the panel driver inside the chamber.

5. The method of claim 1, further comprising: disposing the panel driver outside the chamber.

6. The method of claim 1, further comprising:
   determining injection energy values of a red pixel of the display panel;
   determining injection energy values of a green pixel of the display panel; and
   determining injection energy values of a blue pixel of the display panel.

7. The method of claim 1, further comprising: determining a relation between the plurality of injection energy values and the plurality of voltage values.

8. The method of claim 7, further comprising:
   identifying a first range of the plurality of voltage values that corresponds to a first range of the plurality of injection energy values;
   identifying a second range of the plurality of voltage values that corresponds to a second range of the plurality of injection energy values, the second range of the plurality of injection energy values being smaller than the first range of the plurality of injection energy values; and
   using a selected voltage value in the second range of the plurality of voltage values for operating the organic light emitting diode display device after the identifying the second range of the plurality of voltage values.

9. The method of claim 1, further comprising:
   identifying a first voltage value that corresponds to a first injection energy value;
   identifying a second voltage value that corresponds to a second injection energy value, the second injection energy value being less than the first injection energy value; and
   using the second voltage value for operating the organic light emitting diode display device after the identifying the second voltage value,
   wherein the plurality of injection energy values includes the first injection energy values and the second injection energy value, and
   wherein the plurality of voltage values includes the first voltage value and the second voltage value.

10. An apparatus for measuring injection energy associated with an organic light emitting diode display device, the organic light emitting diode display device including a display panel and a panel driver, the display panel including an organic light emitting member and being configured to display an image, the panel driver being configured to drive the display panel, the apparatus comprising:
- a chamber configured to contain the display panel and configured to control temperature of the display panel;
- a power supplier configured to provide voltages to the display panel;
- a panel signal device disposed outside the chamber and configured to determine a voltage-current relation associated with the organic light emitting member for each temperature value of the plurality of temperature values; and
- a computer including hardware and configured to calculate a plurality of injection energy values using the plurality of electric current values and the plurality of temperature values.

11. The apparatus of claim 10, wherein the power supplier is disposed outside the chamber.

12. The apparatus of claim 10, wherein the chamber is configured to contain the panel driver.

13. The apparatus of claim 10, wherein the chamber is configured to accommodate a flexible printed circuit board that includes a first end disposed inside the chamber for connecting to the display panel and includes a second end disposed outside the chamber for connecting to the panel driver.

14. The apparatus of claim 10, wherein the computer is configured to determine injection energy values of a red pixel of the display panel, configured to determine injection energy values of a green pixel of the display panel; and configured to determine injection energy values of a blue pixel of the display panel.

* * * * *